United States Patent
Ursan et al.

(10) Patent No.: US 7,117,783 B2
(45) Date of Patent: Oct. 10, 2006

(54) RECIPROCABLE PISTON WITH A FLUID SCAVENGING SYSTEM AND METHOD OF SCAVENGING A FLUID

(75) Inventors: Mihai Ursan, Burnaby (CA); Anker Gram, Vancouver (CA); Randall Mark, Vancouver (CA)

(73) Assignee: Westport Power Inc., Vancouver (CA)

( * ) Notice: Subject to any disclaimer, the term of this patent is extended or adjusted under 35 U.S.C. 154(b) by 27 days.

(21) Appl. No.: 10/508,618

(22) PCT Filed: Mar. 26, 2003

(86) PCT No.: PCT/CA03/00438

§ 371 (c)(1),
(2), (4) Date: Mar. 10, 2005

(87) PCT Pub. No.: WO03/083300

PCT Pub. Date: Oct. 9, 2003

(65) Prior Publication Data

US 2005/0180869 A1 Aug. 18, 2005

(30) Foreign Application Priority Data

Mar. 28, 2002 (CA) .................................. 2379645

(51) Int. Cl.
*F04B 31/00* (2006.01)
(52) U.S. Cl. .......................................... 92/159; 92/160

(58) Field of Classification Search .................... 92/81, 92/86, 159, 160
See application file for complete search history.

(56) References Cited

U.S. PATENT DOCUMENTS 5,807,083 A 9/1998 Tomoiu

FOREIGN PATENT DOCUMENTS

| DE | 1173297 | 7/1964 |
| DE | 3902658 | 8/1990 |
| DE | 3902658 A * | 8/1990 |

* cited by examiner

*Primary Examiner*—Thomas E. Lazo
(74) *Attorney, Agent, or Firm*—McAndrews, Held & Malloy, Ltd.

(57) ABSTRACT

A reciprocable piston comprises a cylindrical body reciprocable within a hollow cylinder and at least two spaced ring seals disposed around the circumference of the cylindrical body. Within the cylindrical body there is a scavenging system that comprises: an internal chamber that is in fluid communication with a space between the spaced ring seals; and a one-way fluid passage that allows one-way fluid flow from the internal chamber to the cylinder chamber when fluid pressure within the internal chamber is greater than fluid pressure within the cylinder chamber. A method of scavenging fluid comprises collecting fluid that leaks by a piston seal and returning the collected fluid to the cylinder chamber from which it originated, through a scavenging system disposed within the piston.

40 Claims, 6 Drawing Sheets

RECIPROCABLE PISTON WITH A FLUID SCAVENGING SYSTEM AND METHOD OF SCAVENGING A FLUID

FIELD OF THE INVENTION

The present invention relates to a piston with a fluid scavenging system and method of scavenging a fluid. A piston is reciprocable within a cylinder while acting as a fluid barrier. A fluid scavenging system and method are provided for scavenging fluid that leaks by the piston ring seals.

BACKGROUND OF THE INVENTION

Providing a good seal between the piston and cylinder is especially important in so-called "free-floating" piston compressors. In a free-floating piston compressor there is no piston rod and the piston movement is governed by the differential pressure between chambers within the compressor cylinder on opposite sides of the piston. One chamber acts as the drive chamber and the opposite chamber acts as the compression chamber. During a compression stroke, hydraulic fluid is supplied to the drive chamber to compress the fluid in the compression chamber. During an intake stroke, hydraulic fluid is removed from the drive chamber and new fluid flows into the compression chamber.

Although the actual differential pressure can be small, the absolute fluid pressures can be very high. For example, free-floating piston compressors can have a discharge pressure in excess of 5000 psi (about 34.5 Mpa).

The failure of the piston ring seal can have damaging consequences. With a closed loop hydraulic system it is important to prevent leakage of the hydraulic fluid out of the hydraulic system. Leakage of the hydraulic fluid into the compression chamber would also contaminate the compression fluid. By way of example, if the compression fluid is a gas that is used as fuel for an engine, and hydraulic fluid leaks into the fuel, the presence of hydraulic fluid in the fuel can cause higher pollutant levels in the engine exhaust. A fluid separator may be required downstream of the compressor if the piston seal cannot provide a reliable and effective seal. In addition to the added complexity and cost of adding a fluid separator, the pressure drop across such a device reduces the efficiency of the compressor system. Accordingly, a piston seal that minimizes leakage of hydraulic fluid into the compression fluid is preferable.

In addition, leakage of compression fluid into the hydraulic system must be guarded against. For example, if the compression fluid is a gas, introduction of gas into the hydraulic system could cause damage to the hydraulic pump or could otherwise cause the hydraulic system to cease functioning.

Accordingly, there is a need for a method and apparatus for a high pressure reciprocating piston and cylinder arrangement that scavenges fluid that leaks by the piston seals and returns the scavenged fluid to the piston chamber from which it originated.

SUMMARY OF THE INVENTION

A reciprocable piston comprises a cylindrical body reciprocable within a hollow cylinder. The reciprocable piston divides the hollow cylinder into a first cylinder chamber and a second cylinder chamber. At least two spaced ring seals are disposed around the circumference of the cylindrical body to provide a seal between the reciprocable cylindrical body and the interior walls of the hollow cylinder. A scavenging system is disposed within the cylindrical body. Such scavenging system comprises an internal chamber in fluid communication with a space between said spaced ring seals, and, a one-way fluid passage that allows one-way fluid flow from the internal chamber to the first cylinder chamber. In a preferred embodiment, the one-way fluid passage comprises a check valve that ensures that fluid can only flow in one direction, from the internal chamber to the first cylinder chamber.

Fluid originating from the first cylinder chamber that leaks by one of the ring seals is collected from the space between spaced ring seals and directed to the internal chamber. When the fluid pressure within the internal chamber is greater than the fluid pressure within the first cylinder chamber by an amount sufficient to overcome the exit losses associated with exiting the internal chamber, the fluid flows back into the first cylinder chamber from which it originated.

The scavenging system can further comprise an annular cavity disposed around the circumference of the cylindrical body between the spaced ring seals to facilitate collection of scavenged fluid. A fluid passage can be employed to fluidly connect the annular cavity to the internal chamber.

The fluid recovered by the scavenging system can be a gas or a liquid. When the fluid is a liquid, the scavenging system preferably further comprises a mechanism to assist with displacing the liquid from the internal chamber.

In one embodiment a compressible member can be employed for this purpose. The volume of the compressible member shrinks to accommodate scavenged fluid that is collected within the internal chamber. When the pressure of the liquid within the internal chamber is higher than the liquid pressure within the cylinder chamber, the compressible member can expand in volume to help displace the liquid from the internal chamber. An example of such a compressible member is a bladder filled with a compressible gas, such as air or nitrogen. Another example of a suitable compressible member is a closed-cell foam member, with each cell acting as a small bladder.

When the piston is a free-floating piston and fluid is contained in both first and second cylinder chambers, two scavenging systems can be employed to return respective fluids to the cylinder chambers from which they originated. These two scavenging systems can be independent systems or can cooperate with each other, as will be described later.

For example, a free-floating piston arrangement can be employed to compress a gas wherein a first cylinder chamber is filled with a gas and a second cylinder chamber is filled with a drive fluid, such as hydraulic oil. In another example, the gas can be the drive fluid, in an arrangement that employs gas pressure to drive a liquid pump.

In an example where two scavenging systems cooperate with each other, the combined scavenging system can utilize the pressure of scavenged gas to help return scavenged liquid to the liquid-filled cylinder chamber. In this embodiment a displaceable member is disposed within the internal chamber, dividing the internal chamber into two subchambers. This member is displaceable under the influence of gas pressure within a gas-filled subchamber to displace a scavenged liquid from within a liquid-filled subchamber, whereby the scavenged liquid is returned to the liquid-filled cylinder chamber through a one-way fluid passage.

The apparatus associated with such a combined scavenging system comprises a first pair of ring seals that are employed to seal a side of the piston body associated with the liquid-filled cylinder chamber, and a second pair of ring seals that are employed to seal a side of the piston body associated with the gas-filled cylinder chamber. A space between the first pair of ring seals is fluidly connected to the liquid-filled subchamber so that liquid that leaks from the liquid-filled cylinder chamber is collected within the liquid-filled subchamber. A space between the second pair of ring seals is fluidly connected to the gas-filled subchamber so that gas that leaks from the gas-filled cylinder chamber is collected within the gas-filled subchamber.

In the example where the apparatus is a gas compressor, during operation, the liquid pressure within the liquid-filled cylinder chamber is lowest during a gas intake stroke when liquid is being removed from the drive chamber, which is the liquid-filled cylinder chamber. Within the piston body, the gas-filled and liquid-filled subchambers can be filled with scavenged fluids that leaked into the scavenging system during a compression stroke when fluid pressure within the respective gas-filled and liquid-filled cylinder chambers is highest. Accordingly, during a gas intake stroke, the fluid pressure within the subchambers can be at an intermediate pressure, lower than the pressures in the respective cylinder chambers during a compression stroke, and higher than the fluid pressures in the respective cylinder chambers during an intake stroke. Because fluid leakage rates may be different from the respective cylinder chambers, this may contribute to a pressure differential between the two subchambers. During an intake stroke, because gas pressure within the compression chamber is higher than liquid pressure in the drive chamber, there can be a tendency for gas pressure within the gas-filled subchamber to be higher than liquid pressure within the liquid-filled subchamber, by at least the quantum of the pressure differential between the respective gas and liquid pressures. Accordingly, at least the same pressure differential that causes movement of the piston body can also be applied to the member within the internal chamber to cause it to be displaced, thereby facilitating displacement of liquid from the liquid-filled subchamber and return of the scavenged liquid to the liquid-filled cylinder chamber.

The gas pressure within the gas cylinder chamber during an intake stroke depends upon the apparatus and its application. For example, if the apparatus is a compressor that compresses gas to a pressure of 4000 psi (about 27.6 MPa), gas pressure during an intake stroke can be 400 psi (about 2.76 MPa) if the compression ratio is 10:1, or 2000 psi (about 13.8 MPa) if the compression ratio is 2:1. In any case, a pressure differential is established between the compression and intake strokes, and when the captured scavenged gas leaks from the originating chamber during a compression stroke, the intermediate pressure of the scavenged fluid can be significantly higher than the intake pressure. The difference between the intermediate pressure and the respective intake pressure can cause a pressure differential between the subchamber and the respective cylinder chamber sufficient to overcome exit losses, resulting in the recovery of scavenged fluid. By way of example, referring to the embodiments of FIGS. 3A and 3B, if only a small quantity of liquid has leaked into subchamber 320a, the pressure of the captured scavenged gas within subchamber 320b can be high enough to displace the movable member (326, 328) so that the volume of subchamber 320a substantially matches the volume of the scavenged liquid. While it is the differential pressure between the subchambers and the respective cylinder chambers that enables the recovery of the scavenged fluid, compared to a subchamber with a fixed volume, the displacement of the displaceable member helps with the fluid recovery of the scavenged liquid.

In the example where the apparatus is a liquid pump, the scavenging system operates in substantially the same manner, but with the lowest pressure in the cylinder chambers occurring when the liquid is being supplied to the pump chamber and when gas is being expelled from the drive chamber. During a liquid intake stroke, the fluid pressure within the subchambers can be higher than the fluid pressures in the respective cylinder chambers, in which case, gas pressure within the gas-filled subchamber can move the member within the internal chamber to help displace liquid from the liquid-filled subchamber, thereby returning the scavenged liquid from the liquid-filled subchamber to the liquid-filled cylinder chamber. During the liquid intake stroke, liquid pressure within the liquid-filled cylinder chamber is higher than the gas pressure within the gas-filled cylinder chamber so the check valve for returning gas to the gas-filled cylinder chamber is selected to require an opening force that allows enough gas pressure to be retained within the gas-filled subchamber to displace the liquid from the scavenging system. Other well-known means can be employed instead to achieve the same result. By way of example, the cross sectional area of the one-way gas passage for returning gas to the gas-filled cylinder chamber can be reduced or can comprise an orifice to restrict gas flow and cause higher exit losses. However, with all embodiments, the scavenged liquid and scavenged gas can be returned to their respective cylinder chambers simultaneously if a sufficient pressure differential exists.

By way of example, the displaceable member disposed within the internal chamber can be a flexible fluid-impermeable membrane or a reciprocable piston.

An additional feature for guarding against fluid leakage is a face seal arrangement that provides a seal between and end face of the cylindrical piston body and an opposing end plate surface. The piston end face contacts the end plate surface when the piston changes direction between piston strokes or when the apparatus is shut down. In preferred arrangements, one of the piston sealing surface and the end face surface comprises a resilient member. To guard against leakage around the piston ring seals from fluid ports disposed in the end plate, the end face sealing surface and corresponding end plate surface can be in the shape of a continuous ring surrounding the fluid ports. Similarly, sealing areas are preferably disposed around the opening provided in the piston end face for the exit of the one-way fluid passage from the scavenging system.

In a preferred arrangement of the reciprocable piston, the piston comprises:

(a) a cylindrical body comprising a first end face and a second end face;

(b) a first ring seal disposed around the circumference of the cylindrical body proximate to the first end face;

(c) a second ring seal disposed around the circumference of the cylindrical body proximate to the second end face; and (d) at least one intermediate ring seal disposed around the circumference of the cylindrical body between and spaced apart from the first and second ring seals;

(e) a scavenging system disposed within the cylindrical body, the scavenging system comprising:

a first internal chamber in fluid communication with a space between the first ring seal and the intermediate seal;

a first one-way fluid passage through which a first fluid originating from the first cylinder chamber is flowable from the first internal chamber to the first cylinder chamber when fluid pressure within the first internal chamber is greater than fluid pressure within the first cylinder chamber;

a second internal chamber in fluid communication with a space between the second ring seal and the intermediate seal; and a second one-way fluid passage through which a second fluid originating from the second cylinder chamber is flowable from the second internal chamber to the second cylinder chamber when fluid pressure within the second internal chamber is greater than fluid pressure within the second cylinder chamber.

A method is provided of scavenging fluid that originates from a cylinder chamber and leaks by a piston seal associated with a reciprocable piston body. The method comprises:

collecting a scavenged fluid from between a pair of spaced ring seals disposed around the circumference of the piston body;

holding the scavenged fluid within the piston body when fluid pressure of the scavenged fluid held within the piston body is less than fluid pressure within the cylinder chamber; and returning the scavenged fluid to the cylinder chamber from which the scavenged fluid originated, when pressure of the scavenged fluid within the piston body is greater than fluid pressure within the cylinder chamber.

When the scavenged fluid is a liquid, in one embodiment the method further comprises holding the scavenged fluid within an internal chamber within the piston body, and compressing a compressible member that is disposed within the internal chamber when pressure within the internal chamber is less than pressure within the cylinder chamber. The compressible member is expandable to displace fluid from the internal chamber when fluid pressure within the internal chamber is greater than fluid pressure within the cylinder chamber. By way of example, the compressible member can comprise, a fluid-impermeable bladder filled with a gas or a piece of closed-cell foam.

In another embodiment, an internal chamber disposed within the piston body is divided by a displaceable member into two subchambers, with each subchamber fluidly isolated from the other subchamber, for holding scavenged gas and scavenged liquid in respective subchambers. The scavenged liquid, which originates from a first cylinder chamber, is collected from between a first pair of spaced ring seals disposed around the circumference of the piston body, and the scavenged gas, which originates from a second cylinder chamber is collected from between a second pair of spaced ring seals disposed around the circumference of the piston body. The method further comprises holding the scavenged liquid within a respective subchamber when fluid pressure of the scavenged liquid is less than fluid pressure within the first cylinder chamber, holding the scavenged gas within a respective subchamber when fluid pressure of the scavenged gas is less than fluid pressure within the second cylinder chamber, and utilizing the pressure of the scavenged gas to displace the displaceable member to help expel the scavenged liquid from its respective subchamber. In preferred embodiments the displaceable member is a flexible fluid-impermeable membrane or an internal piston disposed within a hollow cylindrical portion of the internal chamber.

In preferred embodiments the method further comprises returning the piston to a position near an end plate when the piston is stopped or at the completion of an intake stroke, whereby a sealing surface of the piston contacts and seals against a surface of the end plate.

BRIEF DESCRIPTION OF THE DRAWINGS

The drawings illustrate specific embodiments of the invention but should not be considered as restricting the spirit or scope of the invention in any way:

FIG. 4 also depicts an end face seal arrangement that can also be employed with any of the other embodiments.

DETAILED DESCRIPTION OF PREFERRED EMBODIMENT(S)

Figure 1:
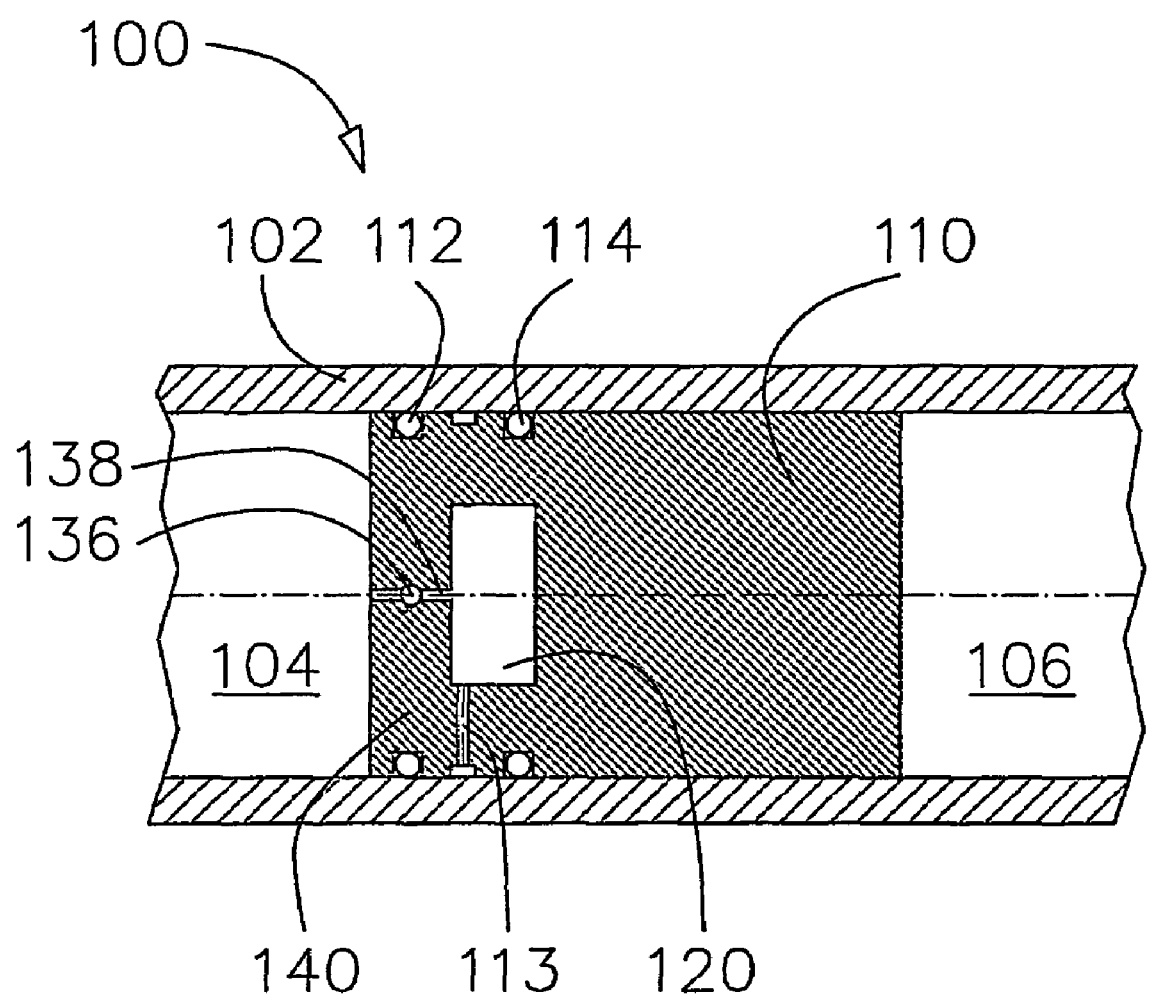
FIG. 1 is a schematic partial section view of a reciprocable piston disposed within a cylinder. In this embodiment the piston comprises a scavenging system that is provided within the body of the piston for scavenging gas that leaks by the ring seals and returning the scavenged gas to the cylinder chamber from which it originated.

Referring to the drawings, FIG. 1 is a schematic partial section view of reciprocating piston assembly 100 that comprises cylinder 102 and a piston disposed within cylinder 102 dividing it into cylinder chamber 104 on one side of the piston and cylinder chamber 106 on the other side of the piston.

The piston comprises cylindrical body 110 that is a matched fit with the bore of cylinder 102. For all embodiments, the piston body is preferably cylindrical, and the bore is preferably circular, but other shapes are possible as long as the shape of the cylinder body is matched to the shape of the cylinder bore.

In the embodiment of FIG. 1, two spaced ring seals 112, 114 provide a seal between piston body 110 and cylinder 102 close to the side of the piston that faces compression chamber 104.

A scavenging system is disposed within cylindrical body 110 for capturing fluid that leaks from cylinder chamber 104 by ring seal 112. The scavenging system comprises fluid passage 113 that fluidly connects a space between ring seals 112 and 114 with internal chamber 120 within piston body 110.

One-way flow controller 136 is located in fluid passage 138 to allow one-way fluid flow through piston head 140 from internal chamber 120 to cylinder chamber 104. A one-way flow controller is defined herein as a device, for allowing one-way flow through a fluid passage. Such devices are known to those skilled in the art as check valves and there are many types of suitable check valves, such as, by way of example, ball check valves, spring assisted ball check valves, wafer check valves and disc check valves. Fluid flows through the one-way flow controller when the pressure within cylinder chamber 104 is less than the pressure within internal chamber 120 and the pressure differential is sufficient to open one-way flow controller 136.

By way of example, piston assembly 100 can be employed as part of a gas compressor, with cylinder chamber 104 serving as a compression chamber. Piston body 110 can be actuated by a drive means through a connecting rod (not shown) or by hydraulic fluid pressure within cylinder chamber 106. With reference still to FIG. 1, in a compression stroke, piston body 110 moves to the left to compress gas in cylinder chamber 104. During the compression stroke, if pressurized gas leaks by ring seal 112, it is caught in the space between spaced ring seals 112 and 114 and flows through fluid passage 113 into internal chamber 120. As shown in FIG. 1, fluid passage 113 can comprise an annular groove formed in the outer surface of piston body 110 to facilitate the collection of leaked gas.

Leaked gas is held at pressure within piston body 110 until gas pressure within internal chamber is greater than gas pressure within cylinder chamber 104. Generally, leaked gas remains within piston body 110 during the compression stroke, and is returned to cylinder chamber 104 through fluid passage 138 and one-way flow controller 136 during the intake stroke, when gas pressure within cylinder chamber 104 is much lower.

While the arrangement shown in FIG. 1 can be used to scavenge all types of fluids, it is most suitable for scavenging a compressible fluid such as pressurized gas, because its own fluid pressure can be used to return it to cylinder chamber 104. However, when the reciprocating piston assembly and scavenging system is employed to recover non-compressible fluids, such as liquids, it is preferable to provide a mechanism to help push the scavenged liquid back into the cylinder chamber (for example, mechanisms such as those described below with reference to the embodiments of FIGS. 2A and 2B, or FIGS. 3A and 3B).

Figure 2A:
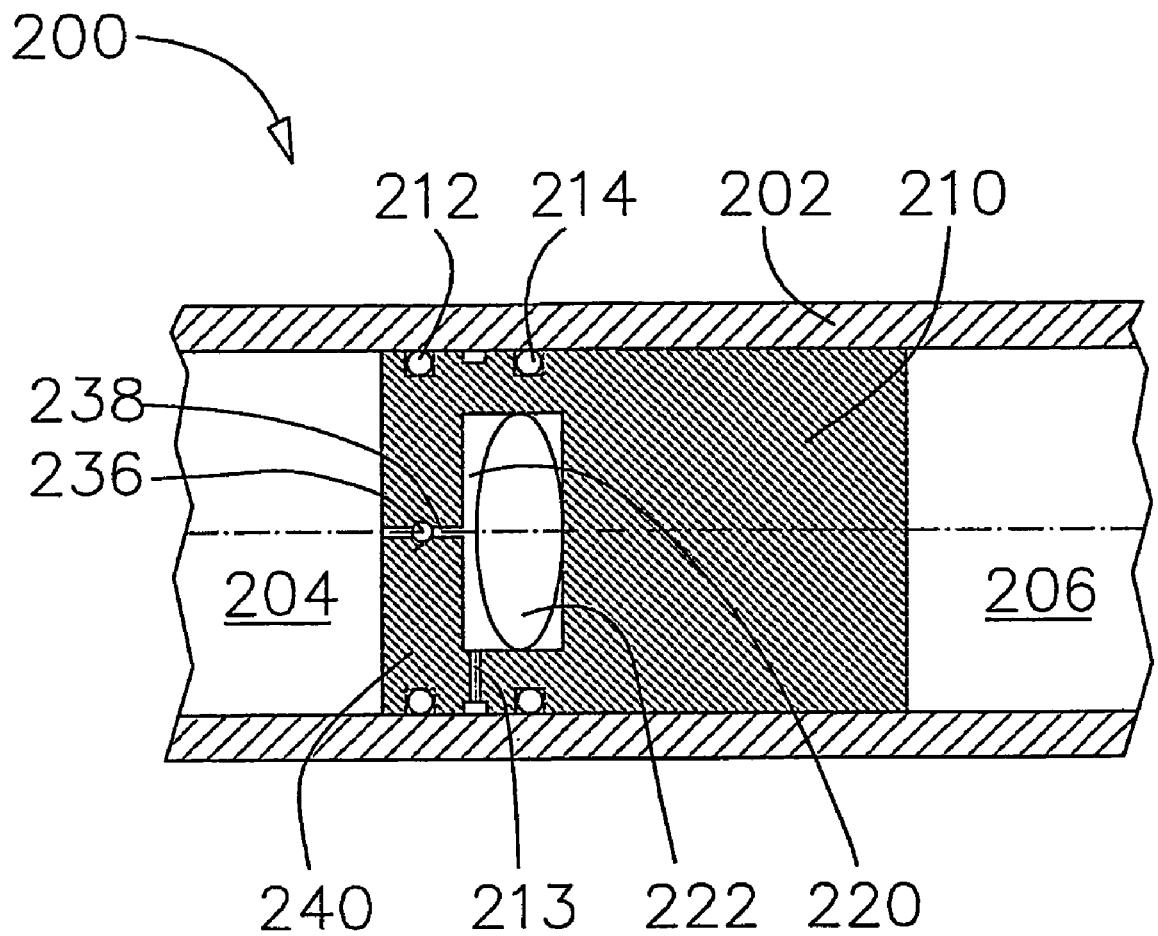
FIGS. 2A and 2B are partial section views of embodiments of a reciprocable piston disposed within a cylinder. In these embodiments the piston comprises a scavenging system that comprises a compressible member disposed within an internal chamber within the body of the piston. The compressible member fills the volume of the internal chamber that is not filled with scavenged fluid and expands to assist with displacing the scavenged fluid from the internal chamber when the scavenged fluid is returned to the cylinder chamber from which it originated.
Figure 2B:
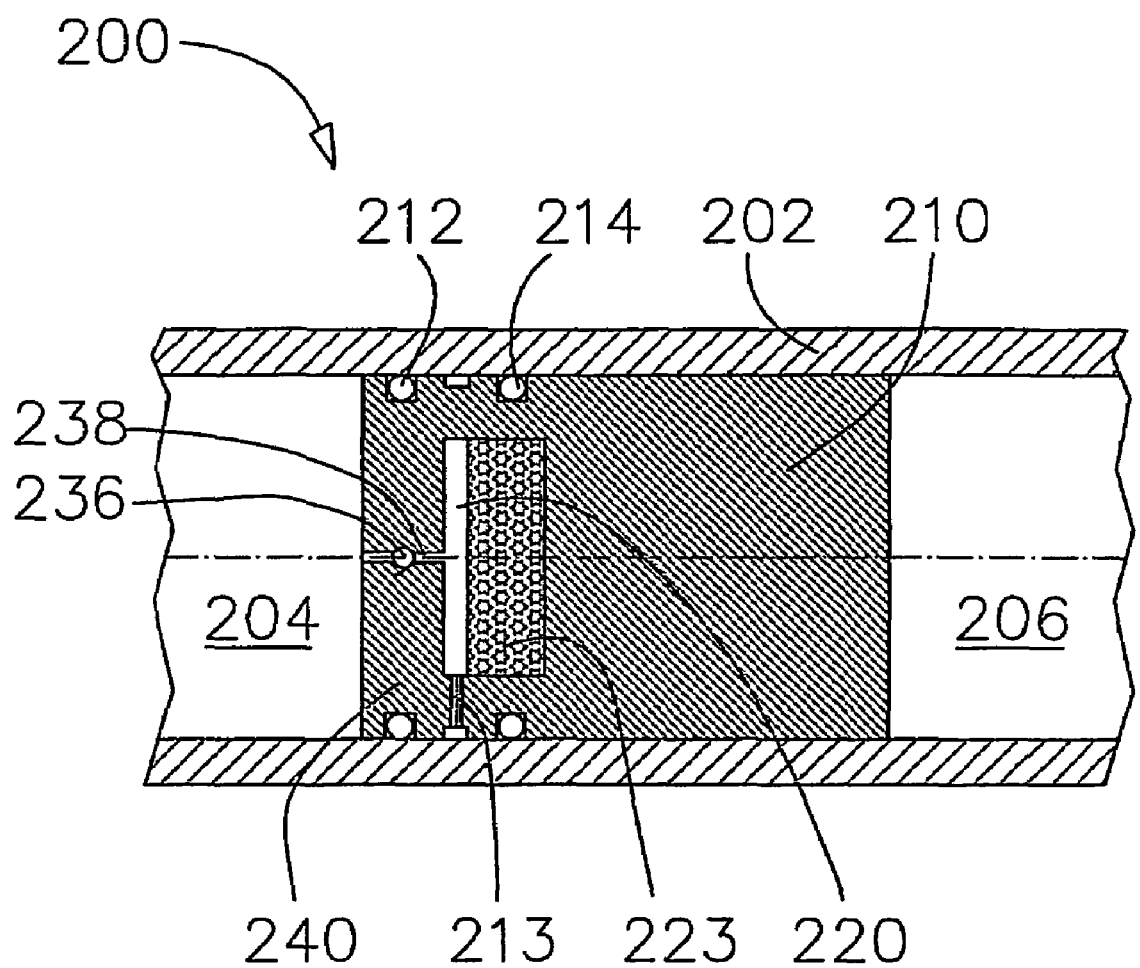

FIGS. 2A and 2B show two embodiments of piston assembly 200 that each have a scavenging system that could be employed to return a scavenged liquid to the cylinder chamber from which it originated. In these figures, the same reference numerals are used in the respective figures to denote like components, and like components are not described for each embodiment if they are substantially the same. In these embodiments a compressible member is employed to assist with the displacement of the scavenged liquid from an internal chamber 220 of the scavenging system.

While FIGS. 2A and 2B show two preferred embodiments of a compressible member, it is understood that other compressible members can be employed to function in the same manner to achieve substantially the same result. For example, the compressible member can be a solid that is substantially impermeable while being compressible on a molecular level. In another example, the compressible member can comprise an open structure that is sealed within a fluid impermeable skin or coating.

In essence, with reference to FIGS. 2A and 2B, the compressible member functions as described below. When the scavenged fluid is a liquid, and thus not compressible, the compressible member shrinks in volume under the pressure of the scavenged liquid to make room within internal chamber 220 to accommodate the scavenged liquid. When the fluid pressure within cylinder chamber 204 is less than the pressure of the scavenged liquid within internal chamber 220, the scavenged fluid is returned to cylinder chamber 204. As the scavenged fluid exits internal chamber 220, the fluid pressure acting on the compressible member is reduced and the compressible member expands in volume, thereby helping to displace the scavenged fluid from internal chamber 220.

With reference to FIGS. 2A and 2B, piston body 210 is reciprocable within cylinder 202, whereby piston assembly 200 can be operable for many well-known applications. By way of example, piston assembly 200 can employ hydraulic fluid pressure within cylinder chamber 204 to compress a gas in cylinder chamber 206, or, in a different application, piston assembly 200 can be employed to pump a liquid within cylinder chamber 204.

Ring seals 212 and 214 provide a dynamic seal between movable piston body 210 and the interior walls of hollow cylinder 202. Liquid that leaks by ring seal 212 from drive chamber 204 flows through fluid passage 213 into internal chamber 220.

With reference to the particular embodiment shown in FIG. 2A, the compressible member is in the form of bladder 222, which is disposed within internal chamber 220. Bladder 222 is filled with a compressible gas whereby the volume occupied by bladder 222 automatically expands to fill the volume of internal chamber 220 that is not filled with scavenged liquid. By way of example, bladder 222 can be filled with a gas such as nitrogen or air. The scavenged liquid is not compressible, and so, to accommodate the scavenged liquid directed to internal chamber 220, the volume of the bladder shrinks by compressing the gas therein.

When the pressure within internal chamber 220 is greater than the pressure within cylinder chamber 204, the scavenged liquid is returned to cylinder chamber 204 through fluid passage 238 and one-way flow controller 236, with the assistance of the bladder pressure and the expanding bladder volume which helps to push the scavenged liquid out of internal chamber 220.

The embodiment shown in FIG. 2B operates in essentially the same manner as the embodiment of FIG. 2A except that instead of bladder 222, this embodiment employs compressible closed-cell foam member 223. Each cell of foam member 223 acts as a tiny bladder, whereby the foam member can expand and contract to fill the volume of internal chamber 220 that is not filled with scavenged liquid. Like bladder 220, foam member 223 expands in volume to help push scavenged liquid back into cylinder chamber 204 when fluid pressure within internal chamber 220 is greater than fluid pressure within cylinder chamber 204 (typically during a gas intake stroke if piston assembly 200 is a gas compressor, or a fluid intake stroke if piston assembly 200 is a liquid pump).

When the piston is what is known as a free-floating piston, the piston is actuated by differential fluid pressure on opposite sides of the piston body. In a free-floating piston compressor, the piston divides the cylinder into a compression chamber and a drive chamber with the piston ring seals guarding against the flow of hydraulic fluid into the compression chamber and the flow of compression fluid into the drive chamber. With a free-floating piston arrangement it is important to prevent fluid from leaking from one cylinder chamber to the other, so a free-floating piston compressor can employ two scavenging systems. For example, in a hydraulically driven free-floating piston, one scavenging system can be employed to recover hydraulic fluid that leaks by the piston ring seals, and to return scavenged hydraulic fluid to the drive chamber. A second scavenging system can be employed to recover compression fluid that leaks by the piston ring seals and to return scavenged compression fluid to the compression chamber.

Figure 3A:
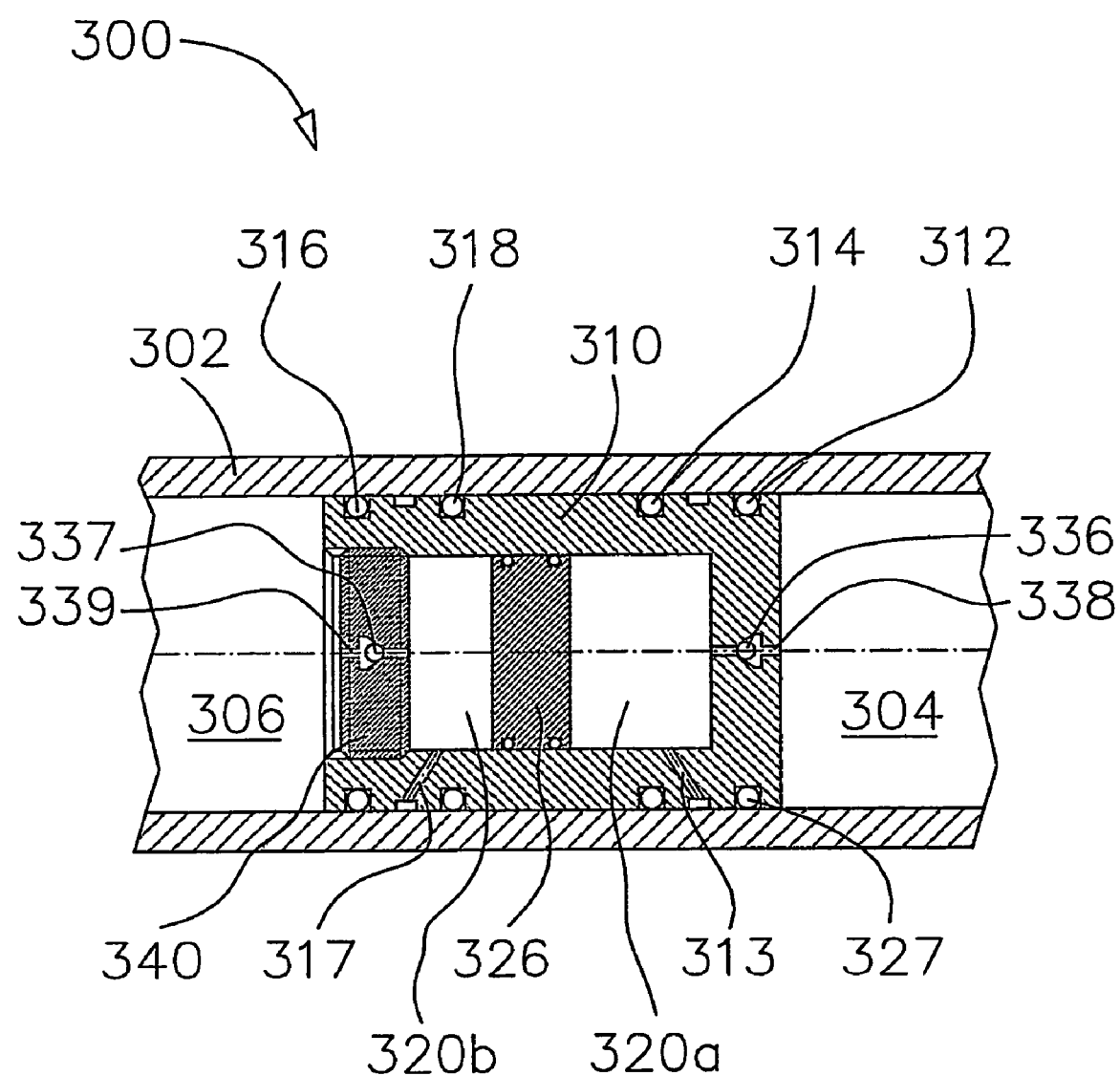
FIGS. 3A and 3B are partial section views of embodiments of a reciprocable piston disposed within a cylinder. In these embodiments, the piston comprises a combined scavenging system that is functional to return two scavenged fluids to respective cylinder chambers from which each scavenged fluid originated. These scavenging systems employ the fluid pressure of one scavenged fluid to displace a member within the piston body to return the other scavenged fluid to the cylinder chamber from which it originated.
Figure 3B:
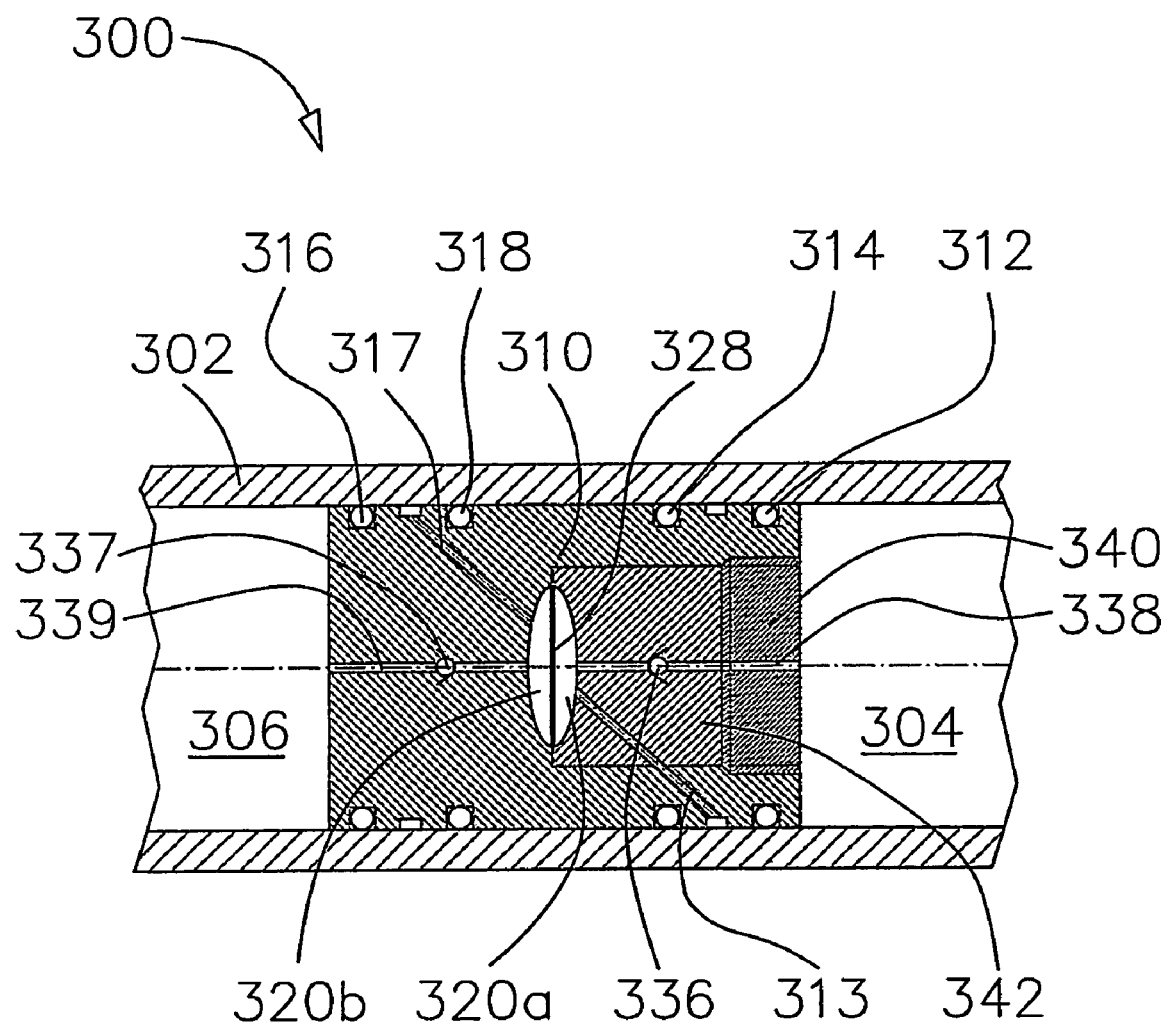

FIGS. 3A and 3B show pistons with combined scavenging systems that employ the fluid pressure of a scavenged gas to displace a member within the piston body to return scavenged liquid to the cylinder chamber from which the liquid originated. The same reference numerals used in FIGS. 3A and 3B indicate like features that operate in substantially the same manner. In these embodiments, apparatus 300 is described as hydraulically driven free-floating piston gas compressor, but those skilled in the art will understand that this embodiment could also be employed for other free-floating reciprocating piston applications, such as, by way of example, a pneumatically driven liquid pump.

In the embodiment of FIG. 3A, free-floating piston body 310 is disposed within cylinder 302, whereby piston body 310 divides the internal volume of cylinder 302 into compression chamber 306 (filled with gas) and drive chamber 304 (filled with hydraulic fluid).

Ring seals 312 and 314 are spaced apart and proximate to drive chamber 304 to prevent hydraulic fluid from leaking therefrom. Ring seals 316 and 318 are spaced apart and proximate to compression chamber 306 to prevent compression fluid from leaking therefrom.

Piston body 310 comprises an internal chamber disposed therein. A displaceable member is disposed within the internal chamber to divide it into subchamber 320a, which is associated with the scavenging system for the hydraulic fluid, and subchamber 320b, which is associated with the scavenging system for the compression fluid.

If hydraulic fluid leaks by ring seal 312, ring seal 314, which is spaced from ring seal 312, prevents hydraulic fluid from leaking further between cylinder body 310 and cylinder 302. Instead, the scavenging system provides fluid passage 313 and subchamber 320a to hold the scavenged hydraulic fluid until it can be returned to drive chamber 304. Like in other embodiments, the scavenging system returns scavenged hydraulic fluid to drive chamber 304 through one-way flow controller 336 and fluid passage 338 when the pressure within subchamber 320a is higher than the fluid pressure within drive chamber 304 and the differential fluid pressure across one-way fluid controller 336 is sufficient to cause it to open, which typically occurs during a gas intake stroke when hydraulic fluid is being expelled from drive chamber 304.

Similarly, if compression fluid leaks by ring seal 316, ring seal 318, which is spaced from ring seal 316, prevents compression fluid from leaking further between cylinder body 310 and cylinder 302. Instead, the scavenging system provides fluid passage 317 and subchamber 320b to hold the scavenged compression fluid until it can be returned to compression chamber 306. Like in other embodiments, the scavenging system returns scavenged fluid to the cylinder chamber from which it originated. That is, scavenged compression fluid is returned to compression chamber 306 through one-way flow controller 337 and fluid passage 339 when the pressure within subchamber 320b is higher the fluid pressure within compression chamber 306, which typically occurs during a gas intake stroke when compression fluid pressure drops to compression fluid supply pressure, which is much lower than the pressure within compression chamber 306 during the compression stroke.

A feature of the embodiment of FIG. 3A is a displaceable member disposed within the internal chamber within piston body 310. In the illustrated embodiment, the displaceable member is piston 326, which is reciprocable within the internal chamber. Ring seals 327 seal between piston 326 and the interior surface of piston body 310 to prevent fluid leakage between subchamber 320a and 320b. Piston 326 moves to an equilibrium position under the influence of the gas pressure in subchamber 320b and the fluid volume in subchamber 320a. During the gas intake stroke, when hydraulic fluid is returned to drive chamber 304, the pressure of scavenged gas within subchamber 320b applies a force to piston 326 to help displace hydraulic fluid from subchamber 320a.

Piston body 310 comprises removeable piston head 340 that can be removed to allow installation and removal of inner piston 326.

In the embodiment of FIG. 3B the displaceable member that divides the internal chamber into subchamber 320a and 320b is flexible fluid-impermeable membrane 328. Membrane 328 and spacer 342 are clamped between cylinder body 310 and cap 340. Spacer 342 can comprise a keyway (not shown) that cooperates with features of piston body 310 to ensure that the portion of fluid passage that passes through spacer 342 is aligned with the portion of fluid passage 313 that passes through piston body 310. One-way flow controller 336 is shown located within spacer 342, but it could also be located within cap 340.

Like in the embodiment of FIG. 3A, in the embodiment of FIG. 3B, scavenged hydraulic fluid is directed to subchamber 320a and scavenged compression fluid is directed to subchamber 320b. The pressure of compression fluid within subchamber 320b can deflect membrane 328 to assist with displacing hydraulic fluid from subchamber 320b when the pressure in drive chamber 304 is lower than the pressure in subchamber 320a.

As with all of the embodiments, with reference to FIGS. 3A and 3B, the pressure differential between the subchambers (320a, 320b) and the associated chambers (304 and 306 respectively) is the primary means for returning scavenged fluid from the subchambers to the respective associated chambers. Displaceable members such as those illustrated in FIGS. 3A and 3B can be used to help in the recovery of scavenged fluid as explained in the following paragraphs.

With reference to FIG. 3A, when compression chamber 306 is filled with gas and drive chamber 304 is filled with hydraulic fluid, during a compression stroke there can be a very high pressure differential between subchambers 320b and 320a. If liquid leaks from drive chamber 304, there is virtually no pressure within subchamber 320a unless the volume of subchamber 320a equals the volume of the scavenged hydraulic fluid. In subchamber 320b, because gas is an expandable fluid, during the compression stroke, the scavenged gas expands to fill subchamber 320b and a differential pressure is exerted against displaceable member 326. This differential pressure can cause inner piston 326 to move until the volume of subchamber 320a is equal to the volume of the scavenged hydraulic fluid. In this way, inner piston 326 can be moved by differential pressure during the compression stroke.

Still with reference to FIG. 3A, during an intake stroke, hydraulic fluid is exiting drive chamber 304, piston 310 is moving from left to right, and the pressure of the gas entering compression chamber 306 is higher than the pressure of the hydraulic fluid in drive chamber 304. Scavenged gas captured in subchamber 320b during the compression stroke may have a pressure higher than the gas pressure within compression chamber 306. Accordingly, at the beginning of the intake stroke, some of the scavenged gas may be recovered and returned to compression chamber 306. However, because there are exit losses associated with the gas flowing through one-way valve 337 and fluid passage 339, the pressure of the gas remaining within subchamber 320b can remain higher than the pressure of the gas within compression chamber 306. Meanwhile, if the pressure of the hydraulic fluid within subchamber 320a is higher than the pressure within drive chamber 304, at the beginning of the intake stroke some hydraulic fluid may be recovered and returned to drive chamber 304. During the intake stroke, because the pressure of the gas within compression chamber 306 is higher than the pressure of the hydraulic liquid within drive chamber 304, the pressure of the scavenged gas within subchamber 320b can be higher than the pressure of the scavenged hydraulic fluid within subchamber 320a. The same pressure differential that overcomes the friction between piston 310 and cylinder 302 can also be present within subchambers 320a and 320b to overcome the friction between inner piston 326 and piston 310. Therefore, during the intake stroke, the pressure of the scavenged gas within 320b can displace inner piston 326 to the right to reduce the volume of subchamber 320a as the volume of the scavenged hydraulic fluid is reduced by the amount of hydraulic fluid that is recovered.

If only a small amount of leakage occurs, a number of cycles can occur before the pressure of the fluid in the scavenging system builds to a pressure that is high enough to return scavenged fluid to the originating chamber. If the fluid is a liquid, and the subchamber has a fixed volume, like the embodiment illustrated in FIG. 1, the fluid containment portion of the scavenging system must be filled with liquid before pressure can build within the scavenging system so that it can be returned to the associated originating chamber during an intake stroke. With the embodiments of FIGS. 3A and 3B, the volume of the subchambers is variable (in FIG. 3A with the help of a displaceable piston, and in FIG. 3B with the help of a displaceable membrane). Therefore, gas pressure within subchamber 320b can displace the movable member (326, 328) to help displace liquid from subchamber 320a.

Figure 4:
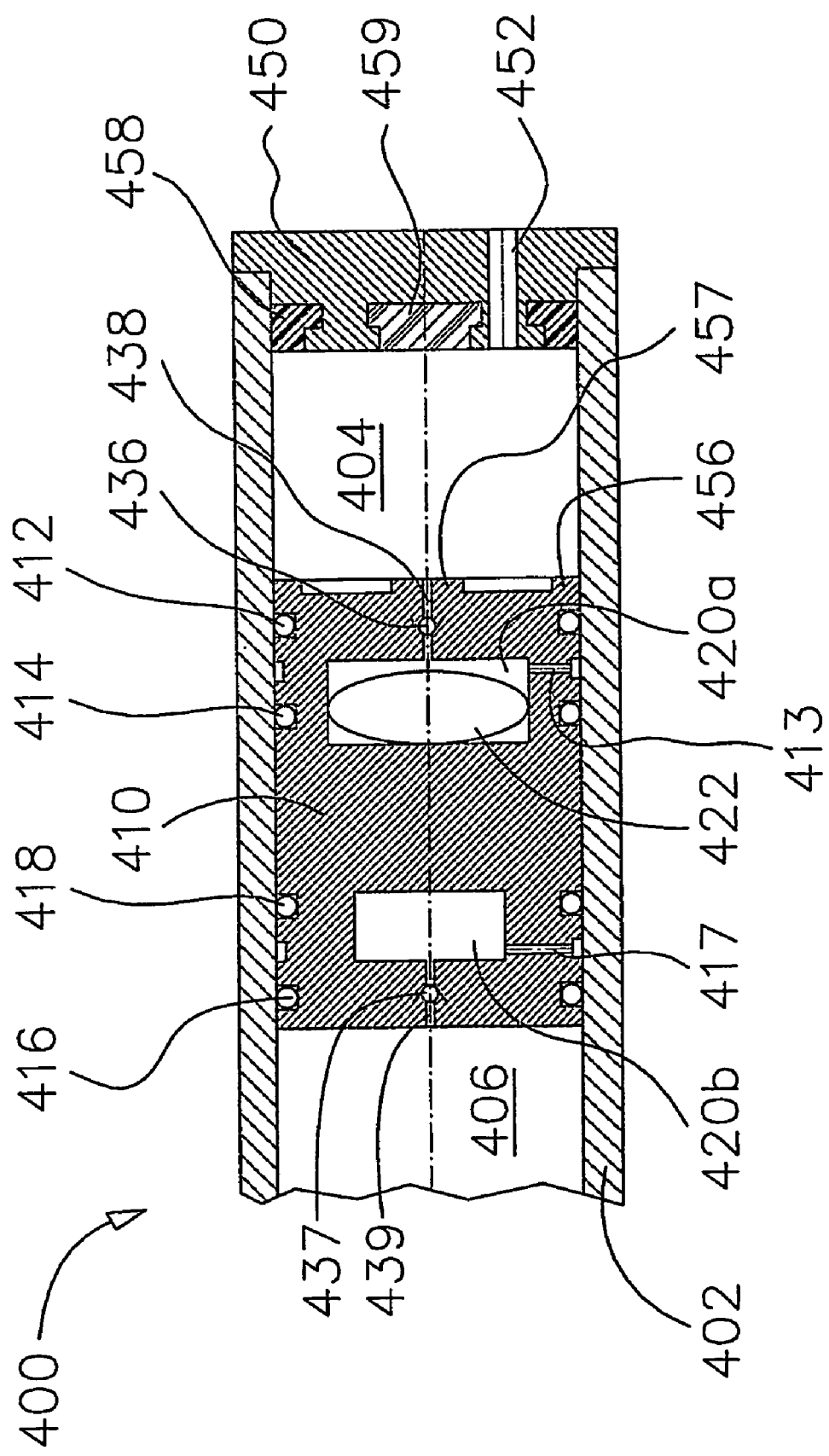
FIG. 4 is a partial section view of an embodiment of a reciprocable piston disposed within a cylinder. In this embodiment, the piston comprises two independent scavenging systems. A first scavenging system is operable to scavenge fluid that leaks from a first cylinder chamber and to return scavenged fluid to the first cylinder chamber. A second scavenging system is operable to scavenge fluid that leaks from a second cylinder chamber and to return scavenged fluid to the second cylinder chamber.

FIG. 4 illustrates an embodiment of a reciprocable piston that comprises two independent scavenging systems. Like the embodiments of FIGS. 3A and 3B, apparatus 400 could be, for example, a gas compressor with a reciprocable free floating piston. In this example, piston body 410 is disposed within cylinder 402, whereby piston body 410 divides the internal volume of cylinder 402 into drive chamber 404 (filled with a hydraulic fluid) and compression chamber 406 (filled with a compression fluid such as natural gas).

Ring seals 412 and 414 are spaced apart and proximate to drive chamber 404 to prevent hydraulic fluid from leaking therefrom. Ring seals 416 and 418 are spaced apart and proximate to compression chamber 406 to prevent compression fluid from leaking therefrom. In this example, the compression fluid is a gas that is compressed by compressor apparatus 400.

Piston body 410 comprises two separate internal chambers disposed therein. The hydraulic fluid scavenging system shown in this embodiment is similar to the scavenging system shown in FIG. 2A, whereas the compression fluid scavenging system is similar to the scavenging system shown in FIG. 1. Those skilled in the art will understand that different embodiments of the scavenging system could be substituted for the ones depicted in FIG. 4, to achieve substantially the same results and that the embodiment shown in FIG. 4 is an example of a scavenging system that comprises two independent systems.

Scavenged hydraulic fluid flows through fluid passage 413 to internal chamber 420a. Bladder 422 is disposed within chamber 420a and is filled with a compressible fluid. When the pressure of the hydraulic fluid within internal chamber 420a is sufficiently higher than the fluid pressure within drive chamber 404, with the assistance of expandable bladder 422, hydraulic fluid is displaced from internal chamber 420a and returned to drive chamber 404 through one-way flow controller 436 and fluid passage 438.

Scavenged compression fluid flows through fluid passage 417 and is held in internal chamber 420b until pressure within internal chamber 420b is higher than pressure within compression chamber 406 (typically during a gas intake stroke), when the scavenged gas is returned to compression chamber 406 through one-way flow controller 437 and fluid passage 439.

FIG. 4 also illustrates a face seal arrangement that can be used in conjunction with any of the scavenging apparatus embodiments. The face seal is a further feature for preventing fluid from leaking from one cylinder chamber to the other cylinder chamber.

End cap 450 seals the end of drive chamber 404 and comprises fluid passage 452 through which hydraulic fluid enters and exits drive chamber 404. Piston body 410 comprises raised sealing surfaces 456 and 457 that cooperate with respective resilient seal members 458 and 459 to provide a fluid seal when piston body 410 is positioned next to end cap 450. This face seal arrangement is functional during compressor operation and when the compressor is shut down. When typical reciprocating compressors operate, there is usually a delay in switching piston direction, for example between an intake stroke and a compression stroke. The disclosed face seal arrangement helps to prevent leakage between the drive and compression chambers during such times when the piston is positioned next to end cap 450. When the compressor is shut down, the compression fluid pressure within the compression chamber can still be as high as 600 psi (about 4.1 MPa) depending upon the system and the inlet gas pressure. The compression fluid pressure pushes piston body 410 towards end cap 450, energizing the face seal by pressing sealing surfaces 456 and 457 into respective resilient seal members 458 and 459.

Sealing surface 456 and resilient member 458 prevent compression fluid from leaking between piston body 410 and cylinder 402 by ring seals 416, 418, 414, and 412. Sealing surface 457 and resilient member 459 prevent compression fluid from leaking between piston body 410 and cylinder 402 by ring seals 416, 418, and 414, and then through the hydraulic fluid scavenging apparatus through fluid passage 413, internal chamber 420a and fluid passage 438. Instead of providing a raised surface for sealing surfaces 456 and 457, the surfaces of resilient members 458 and 459 could project from the surface of the end cap 450 with substantially the same effect.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

The invention claimed is:
1. A reciprocable piston comprises:
   (a) a cylindrical body reciprocable within a hollow cylinder, said cylindrical body dividing said hollow cylinder into a first cylinder chamber and a second cylinder chamber;
   (b) at least two spaced ring seals disposed around the circumference of said cylindrical body; and
   (c) a scavenging system disposed within said cylindrical body, said scavenging system comprising:
   an internal chamber in fluid communication with a space between said spaced ring seals, wherein a fluid that originates from said first cylinder chamber that leaks by one of said spaced ring seals is receivable into said internal chamber and said internal chamber defines a volume that is fillable with said fluid that is variable in size; and
   a one-way fluid passage through which said fluid is flowable from said internal chamber to said first cylinder chamber, when fluid pressure within said internal chamber is greater than fluid pressure within said first cylinder chamber.
2. The reciprocable piston of claim 1 wherein said scavenging system further comprises an annular cavity disposed around the circumference of said cylindrical body between said spaced ring seals.
3. The reciprocable piston of claim 2 further comprising a fluid passage fluidly connecting said annular cavity to said internal chamber.
4. The reciprocable piston of claim 1 wherein said fluid is a gas.
5. The reciprocable piston of claim 1 further comprising a compressible member disposed within said internal chamber.
6. The reciprocable piston of claim 5 wherein said fluid is a liquid.
7. The reciprocable piston of claim 5 wherein said compressible member is a bladder filled with a compressible gas.
8. The reciprocable piston of claim 5 wherein said compressible member is a closed-cell foam member.
9. The reciprocable piston of claim 1 wherein said scavenging system further comprises separate fluid passages for scavenging fluid originating from each of said first and second cylinder chambers, said scavenging system further comprising a displaceable member disposed within said internal chamber whereby said member is displaceable under the influence of the pressure of a scavenged gas originating from within said second cylinder chamber, whereby said member is displaceable to displace from within said internal chamber a scavenged liquid originating from within said first cylinder chamber.
10. The reciprocable piston of claim 9 further comprising a first pair of spaced ring seals disposed around the circumference of said cylindrical body for sealing against fluid leakage from said first cylinder chamber, and a second pair of spaced ring seals disposed around the circumference of said cylindrical body for sealing against fluid leakage from said second cylinder chamber, wherein said displaceable member divides said internal chamber into a first subchamber and a second subchamber, and said first subchamber is in fluid communication with a space between said first pair of ring seals and with said first cylinder chamber through said one-way fluid passage, and said second subchamber is in fluid communication with a space between said second pair of ring seals and with said second cylinder chamber through a second one-way fluid passage.
11. The reciprocable piston of claim 10 wherein said internal chamber comprises a cylindrical cavity and said displaceable member is a piston moveable within said cylindrical cavity.
12. The reciprocable piston of claim 10 wherein said displaceable member is a flexible fluid-impermeable membrane.
13. The reciprocable piston of claim 10 wherein said first cylinder chamber is a drive chamber filled with a hydraulic fluid and said second cylinder chamber is a compression chamber filled with a gas.
14. The reciprocable piston of claim 1 further comprising a check valve disposed within said one-way fluid passage.
15. The reciprocable piston of claim 1 further comprising a sealing surface provided on at least one end face of said cylindrical body to provide a seal between said sealing surface and an opposing end plate surface when these surface are in contact with each other.
16. The reciprocable piston of claim 15 wherein one of said sealing surface and said end plate surface comprises a resilient member.
17. The reciprocable piston of claim 16 wherein said resilient member is in the shape of a ring and fluid openings in said end plate are disposed within the boundaries of said ring.
18. The reciprocable piston of claim 16 wherein said one-way fluid passage has an exit through said end face and said sealing surface comprises a continuous sealing surface surrounding said exit that is sealable against an opposing end plate surface.
19. A piston that is reciprocable within a hollow cylinder, said piston comprising:
   (a) a cylindrical body comprising a first end face partially defining a first cylinder chamber and a second end face partially defining a second cylinder chamber;
   (b) a first ring seal disposed around the circumference of said cylindrical body proximate to said first end face;
   (c) a second ring seal disposed around the circumference of said cylindrical body proximate to said second end face;
   (d) at least one intermediate ring seal disposed around the circumference of said cylindrical body between and spaced apart from said first and second ring seals; and
   (e) a scavenging system disposed within said cylindrical body, said scavenging system comprising:
   a first internal chamber in fluid communication with a space between said first ring seal and said intermediate seal;
   a first one-way fluid passage through which a first scavenged fluid originating from said first cylinder chamber is flowable from said first internal chamber to said first cylinder chamber when fluid pressure within said first internal chamber is greater than fluid pressure within said first cylinder chamber;
   a second internal chamber in fluid communication with a space between said second ring seal and said intermediate seal;
   a second one-way fluid passage through which a second scavenged fluid originating from said second cylinder chamber is flowable from said second internal chamber to said second cylinder chamber when fluid pressure within said second internal chamber is greater than fluid pressure within said second cylinder chamber; and
   a displaceable member disposed within said cylindrical body, said displaceable member dividing an internal chamber into said first internal chamber and said second internal chamber and said displaceable member is displaceable under the influence of a differential pressure between said first internal chamber and said second internal chamber.

20. The piston of claim 19 wherein said piston is a free-floating piston for a reciprocating piston compressor and said first scavenged fluid is a hydraulic fluid.

21. The piston of claim 20 wherein said second scavenged fluid is a gas.

22. The piston of claim 19 wherein said internal chamber comprises a cylindrical cavity and said displaceable member is a piston moveable within said cylindrical cavity.

23. The piston of claim 19 wherein said displaceable member is a flexible fluid-impermeable membrane.

24. The piston of claim 19 further comprising:
a first check valve disposed within said first one-way fluid passage; and
a second check valve disposed within said second one-way fluid passage.

25. The piston of claim 19 further comprising a sealing surface provided on at least one of said first and second end faces of said piston to provide a seal between said sealing surface and an opposing end plate surface when these surfaces are in contact with each other.

26. The piston of claim 25 wherein one of said sealing surface and said opposing end plate surface comprises a resilient compressible member.

27. The piston of claim 26 wherein said resilient compressible member is in the shape of a ring and fluid openings in said end plate are disposed within the boundaries of said ring.

28. A method of scavenging fluid that originates from a cylinder chamber and leaks by a piston seal associated with a reciprocable piston body, said method comprising:
collecting a scavenged fluid from between a pair of spaced ring seals disposed around the circumference of said piston body;
holding said scavenged fluid in an internal chamber within said piston body when fluid pressure of said scavenged fluid held within said piston body is less than fluid pressure within said cylinder chamber;
varying the volume of said internal chamber responsive to the introduction of said scavenged fluid therein; and
returning said scavenged fluid to said cylinder chamber from which said scavenged fluid originated, when pressure of said scavenged fluid within said internal chamber is greater than fluid pressure within said cylinder chamber.

29. The method of claim 28 wherein said piston body is part of a reciprocating piston compressor, said cylinder chamber is a compression chamber, and said fluid is returnable to said compression chamber during an intake stroke when said compressor is operating and while new fluid is introduced into said compression chamber.

30. The method of claim 28 further comprising compressing a compressible member that is disposed within said internal chamber when pressure within said internal chamber is less than pressure within said cylinder chamber, and wherein said compressible member is expandable to displace fluid from said internal chamber when fluid pressure within said internal chamber is greater than fluid pressure within said cylinder chamber.

31. The method of claim 30 wherein said compressible member comprises a fluid-impermeable bladder filled with a gas.

32. The method of claim 30 wherein said compressible member comprises a piece of closed-cell foam.

33. The method of claim 28 wherein a displaceable member divides said internal chamber into two subchambers, which are fluidly isolated from each other, and said method further comprises:

moving said displaceable member to provide space within a first subchamber to receive said scavenged fluid when fluid pressure within said internal chamber is less than pressure within said cylinder chamber; and
moving said displaceable member to displace fluid from said first subchamber when fluid pressure within said first subchamber is greater than pressure within said cylinder chamber.

34. The method of claim 33 wherein said displaceable member is a flexible fluid-impermeable membrane.

35. The method of claim 33 wherein said displaceable member is an internal piston and said internal chamber comprises a cylinder.

36. The method of claim 33 wherein said piston body is a hydraulically driven free-floating piston employed to compress a gas within a compression chamber associated with a first side of said free-floating piston and said fluid is hydraulic fluid that is returned to a drive chamber that is associated with a second side of said free-floating piston.

37. The method of claim 36 wherein said first subchamber is in fluid communication with said drive chamber through a one-way fluid passage that allows hydraulic fluid to be returned to said drive chamber from said first subchamber.

38. The method of claim 28 further comprising returning said piston to a position near an end plate when said piston is stopped or at the completion of an intake stroke, whereby a sealing surface of said piston contacts and seals against a surface of said end plate.

39. A method of scavenging fluid in a piston assembly that comprises a free floating piston that divides a hollow cylinder into a first cylinder chamber filled with a liquid and a second cylinder chamber filled with a gas, said method comprising:
collecting from between a first pair of spaced ring seals disposed around the circumference of said piston body, a scavenged liquid, which originated from said first cylinder chamber;
holding said scavenged liquid within an internal chamber of said piston body when fluid pressure of said scavenged liquid is less than fluid pressure within said first cylinder chamber;
collecting from between a second pair of spaced ring seals disposed around the circumference of said piston body, a scavenged gas, which originated from said second cylinder chamber;
holding said scavenged gas within said internal chamber of said piston body when fluid pressure of said scavenged gas is less than fluid pressure within said second cylinder chamber;
employing a displaceable member within said internal chamber that fluidly isolates said scavenged liquid from said scavenged gas;
using the pressure of said scavenged gas to move said displaceable member to displace said scavenged liquid from said internal chamber when pressure of said scavenged gas is greater than fluid pressure within said first cylinder chamber; and returning said scavenged gas to said second cylinder chamber when the pressure of said scavenged gas is greater than fluid pressure within said second cylinder chamber.

40. The method of claim 39 further comprising returning said scavenged gas to said second cylinder chamber after utilizing the pressure of said scavenged gas to displace said scavenged liquid from said internal chamber and into said first cylinder chamber.

* * * * *